UNITED STATES PATENT OFFICE.

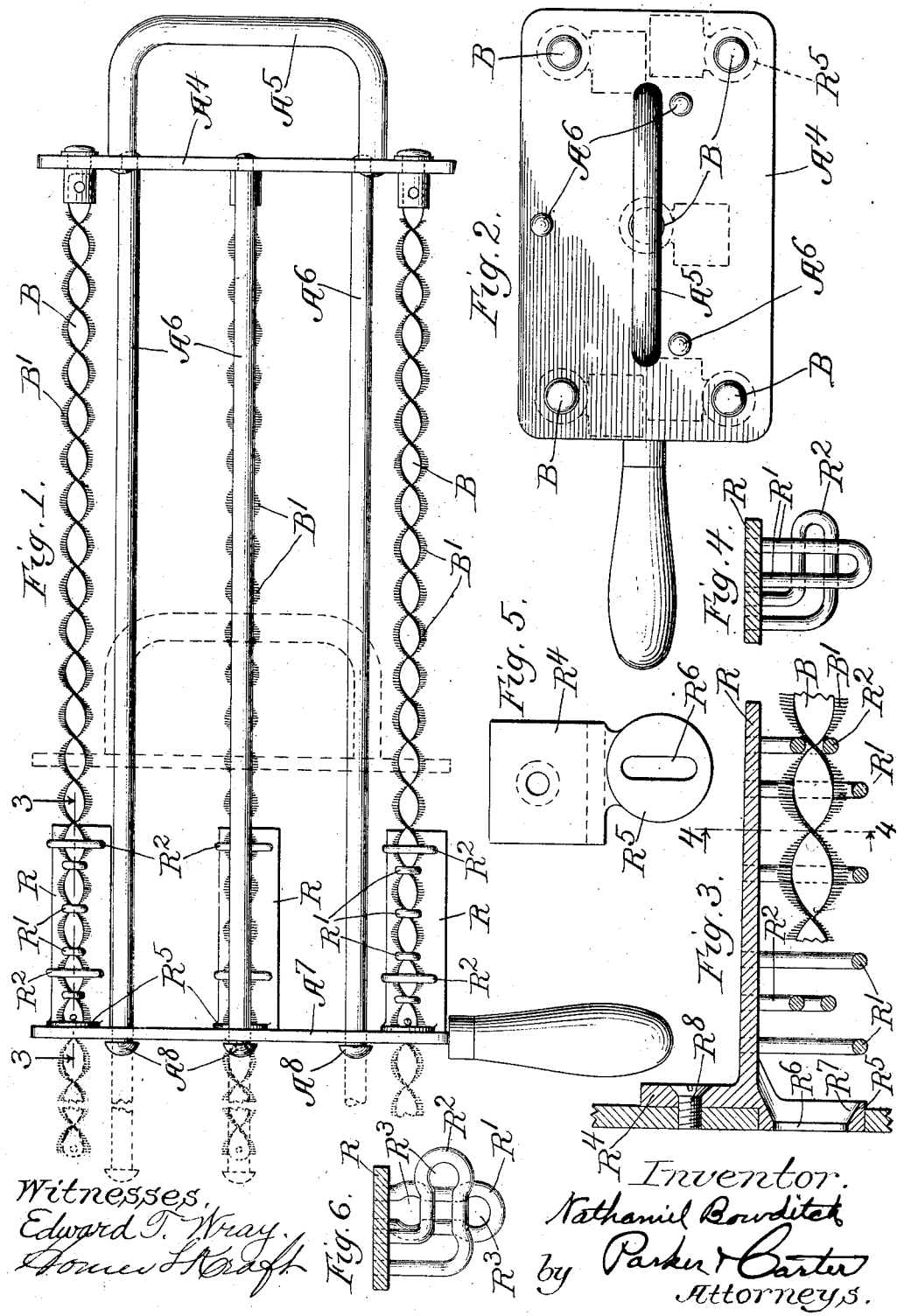

NATHANIEL BOWDITCH, OF AURORA, ILLINOIS.

MANUALLY-OPERATED COTTON-PICKER.

972,324. Specification of Letters Patent. Patented Oct. 11, 1910.

Application filed December 29, 1905. Serial No. 293,737.

*To all whom it may concern:*

Be it known that I, NATHANIEL BOWDITCH, a citizen of the United States, residing at Aurora, in the county of Kane and State of Illinois, have invented a certain new and useful Improvement in Manually-Operated Cotton-Pickers, of which the following is a specification.

My invention relates to cotton picking devices, and has for its object to provide a new and improved device of this description particularly adapted to be operated by hand.

My invention is illustrated in the accompanying drawings, wherein—

Figure 1 is a view of a picker embodying my invention; Fig. 2 is a front view of Fig. 1; Fig. 3 is an enlarged sectional view taken on line 3—3 of Fig. 1; Fig. 4 is a sectional view taken on line 4—4 of Fig. 3; Fig. 5 is an end view of one of the guiding devices for the pickers; Fig. 6 is a view similar to Fig. 4 showing a modified construction.

Like letters refer to like parts throughout the several figures.

A series of spiral cotton pickers B are provided with a series of picking points $B^1$ and are connected with a supporting piece $A^4$ provided with a handle $A^5$. The cotton pickers are preferably rotatably connected to the support $A^4$. Associated with the spiral pickers are a series of rods $A^6$. These rods are preferably connected with the supporting piece $A^4$ and pass through holes in the end-piece $A^7$. Said end-piece is also provided with a suitable handle by means of which it may be held in place. The rods $A^6$ are preferably provided with enlargements $A^8$ which prevent them from being entirely withdrawn from the end-piece. Associated with the end-piece are a series of projecting pieces R fastened to the end-piece in any desired manner, each provided with a series of engaging devices $R^1$, $R^2$ for the pickers. These engaging devices as herein shown consist of staples or looped wires fastened to the projecting part R and there are a series of these engaging devices. It will be noted by referring to Figs. 3 and 4 that the looped wires $R^1$ are simple loops, the ends being fastened to the projecting piece R and the loop projecting straight therefrom. It will further be seen that the looped wires $R^2$ are bent at right angles so that the ends project at right angles to the loops $R^1$ and that the attachment of the ends of the loop $R^2$ is at one side of the points where the ends of loops $R^1$ are attached. This permits the spiral picker to pass through these loops and the spiral of the picker engaging the wires causes the picker to rotate when it is reciprocated. These spiral pickers can be formed in any desired manner, as, for example, by a piece of hair-cloth or wire woven cloth or the like inserted between two bands of steel twisted in a spiral shape.

In Fig. 6 I have shown the loops $R^{11}$ and $R^{20}$ as bent so as to provide enlarged openings $R^3$ at the places where the picking points of the spiral picker pass through the loops. These enlargements prevent wear on these picker points. The projecting pieces R to which the loops are attached are provided with fastening pieces $R^4$ and projecting ends $R^5$ (see Fig. 5), said projecting ends being provided with slots $R^6$ and being beveled as shown at $R^7$, Fig. 3, so that the ends of the pickers will be guided to the slots.

The end-piece $A^7$ is provided with a series of openings through which the projecting ends $R^5$ of the guiding devices pass, the guiding devices then being held in position by a screw $R^8$. It will be seen that the projecting ends $R^5$ form such a construction that one screw $R^8$ is sufficient to hold the projecting pieces R in place. When it is desired to use the device the operator grasps the handles at each end of the device and brings the end plate into proximity to the cotton plant and then pushes upon the handle $A^5$ so as to force the pickers into the cotton plant. The pickers are rotated by this action and the picker points engage the cotton and cause it to be wrapped about the pickers so as to be pulled loose from the cotton bolls. The device can then be moved bodily over some receptacle such as a sack or a basket and the handle $A^5$ pulled back to its initial position. The cotton on the pickers then engages the end plate $A^7$ and is pulled from the pickers and drops into the receptacle. The rods $A^6$ prevent lateral displacement of the parts so as to cause binding or the like, and also because of the enlarged ends prevent the disconnection of the pickers from the end-piece $A^7$.

It will be seen that by this device there is provided a manually operated cotton picker which can be used by any individual such as an ordinary laborer, and which can be brought easily and quickly in operative position with relation to the cotton and then operated to pick the cotton and then moved bodily to a discharge position where the cotton can be discharged into a suitable receptacle.

I claim:

1. A manually operated cotton picker comprising an end-piece provided with a handle, a series of spiral cotton pickers passing through said end-piece said end-piece being provided with guides for the pickers which cause them to be rotated when reciprocated, a handle connected with said cotton pickers arranged so that they can be moved to and from the end-piece.

2. A manually operated cotton picker comprising an end-piece provided with a handle, a series of spiral cotton pickers passing through said end-piece said end-piece being provided with guides for the pickers which cause them to be rotated when reciprocated, a handle connected with said cotton pickers arranged so that they can be moved to and from the end-piece, and a series of rods adapted to prevent displacement thereof.

3. A manually operated cotton picker comprising an end-piece provided with a handle, a series of spiral cotton pickers passing through said end-piece said end-piece being provided with guides for the pickers which cause them to be rotated when reciprocated, a handle connected with said cotton pickers arranged so that they can be moved to and from the end-piece, and a series of rods connected with said cotton pickers and passing through openings in said end-piece so as to move with the pickers.

4. A manually operated cotton picker comprising two handles, a series of spiral cotton pickers connected with one handle, a series of guides therefor connected with the other handle, said handles adapted to be moved relatively so as to project the spiral pickers into and withdraw them from the cotton plants.

5. A manually operated cotton picker comprising two handles, a series of spiral cotton pickers connected with one handle, a series of guides therefor connected with the other handle, a series of rods substantially parallel with said cotton pickers and adapted to form a movable connection between the two handles.

6. A cotton picking device comprising a series of spiral cotton pickers, a non-rotating support therefor, a series of guides through which they pass and by means of which they are rotated when reciprocated, means for moving said pickers through said guides when it is desired to project them into the cotton plants, the entire device adapted to be moved bodily to a discharge position without rotating the said pickers, the cotton being discharged by moving the pickers back to their initial position.

7. A guiding device for spiral cotton pickers comprising a series of looped wires divided into two sets, one set having a simple loop and the other set bent laterally so as to project past the first set.

8. A guiding device for spiral cotton pickers comprising two coöperating looped wires, one loop bent at the end so as to project laterally past the other.

9. A manual cotton picker comprising an end-piece provided with a handle, a series of projecting parts connected therewith, a series of looped wires connected with said projecting parts, a series of spiral cotton pickers adapted to pass through said looped wires and said end-piece, and a handle connected with said cotton pickers.

10. A cotton picking device comprising an end-piece provided with a series of openings, a series of projecting pieces provided with slotted projecting ends adapted to pass through said openings, each projecting piece provided with a fastening part, and means for fastening each fastening part to the end-piece, a series of looped wires connected with the projecting pieces, a series of spiral cotton pickers adapted to engage said looped wires, and a handle connected with said cotton pickers.

11. A cotton picking device comprising an end-piece provided with a series of openings, a series of projecting pieces provided with slotted projecting ends adapted to pass through said openings, each projecting piece provided with a fastening part, and means for fastening each fastening part to the end-piece, a series of looped wires connected with the projecting pieces, a series of spiral cotton pickers adapted to engage said looped wires, a handle connected with said cotton pickers, a series of rods connected with said handle and running parallel with said pickers, said rods also engaging said end-piece.

12. A guiding device for cotton pickers comprising two coöperating looped wires, one loop bent at the end so as to project past the other, the wires bent laterally at predetermined points so as to form enlarged openings, said wires connected to a support.

13. A guiding device for cotton pickers comprising two coöperating looped wires the loops extending substantially at right angles to each other, a portion of each wire bent so as to form an enlargement of the space between them at a predetermined point, said wires connected to a support.

14. A guiding device for cotton pickers comprising a series of looped wires divided into two sets, the wires of one set each formed into a simple loop, the wires of the other set each formed into a loop having two parts at right angles to each other, one of said parts projecting past the first set, the wires of both sets bent at predetermined points so as to form enlargements of the space between them, said wires connected to a support.

15. A manually operated cotton picker comprising two separated relatively movable handles, one adapted to be grasped by the right hand and the other by the left hand, a series of cotton pickers connected with one handle, and a series of guides therefor connected with the other handle.

NATHANIEL BOWDITCH.

Witnesses:
EDNA K. REYNOLDS,
PERCIVAL H. TRUMAN.